United States Patent
Liu (10) Patent No.: US 10,001,826 B2
(45) Date of Patent: Jun. 19, 2018

(54) POWER MANAGEMENT MECHANISM FOR DATA STORAGE ENVIRONMENT

(75) Inventor: Lei Liu, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1943 days.

(21) Appl. No.: 12/354,743

(22) Filed: Jan. 15, 2009

(65) Prior Publication Data

US 2010/0180131 A1    Jul. 15, 2010

(51) Int. Cl.
*G06F 1/30* (2006.01)
*G06F 11/30* (2006.01)

(52) U.S. Cl.
CPC ........... *G06F 1/305* (2013.01); *G06F 1/30* (2013.01); *G06F 11/3058* (2013.01)

(58) Field of Classification Search
CPC ..... G06F 1/26; G06F 1/28; G06F 1/30; G06F 1/305; G06F 11/07; G06F 11/0727; G06F 11/0751; G06F 11/1402; G06F 11/1446; G06F 11/1448; G06F 11/1451; G06F 11/1456; G06F 11/1458; G06F 11/1461; G06F 11/1471; G06F 11/20; G06F 11/2015; G06F 11/3034; G06F 11/3037; G06F 11/3058; G06F 11/11
USPC .... 713/300, 340, 324; 714/6.12, 6.3, 15, 22, 714/24, 38.11; 710/260; 711/135; 718/103, 107
See application file for complete search history.

(56) References Cited

U.S. PATENT DOCUMENTS

| | | | | |
|---|---|---|---|---|
| 4,245,150 A * | 1/1981 | Driscoll et al. | ................ | 377/32 |
| 5,117,324 A * | 5/1992 | Johnson, Jr. | .................... | 361/66 |
| 5,325,509 A | 6/1994 | Lautzenheiser | | |
| 5,828,823 A * | 10/1998 | Byers et al. | .................... | 714/24 |
| 6,195,754 B1 * | 2/2001 | Jardine et al. | ................ | 713/324 |
| 6,345,369 B1 * | 2/2002 | Kitamorn et al. | .............. | 714/14 |
| 7,062,675 B1 * | 6/2006 | Kemeny et al. | ................ | 714/15 |
| 7,131,013 B2 | 10/2006 | Sasakura et al. | | |
| 7,213,110 B2 | 5/2007 | Nakayama et al. | | |
| 7,280,354 B2 | 10/2007 | Sone | | |
| 7,421,552 B2 | 9/2008 | Long | | |
| 2005/0270927 A1* | 12/2005 | Hayashi | ....................... | 369/47.1 |
| 2006/0133181 A1* | 6/2006 | Amano | ....................... | 365/229 |

(Continued)

OTHER PUBLICATIONS

Varma, Anujan, et al. "Destage Algorithms for Disk Arrays with Nonvolatile Caches". IEEE Transactions on Computers. vol. 47, No. 2. Feb. 1998. pp. 228-235.*

(Continued)

Primary Examiner — Thomas J Cleary
(74) Attorney, Agent, or Firm — Griffiths & Seaton PLLC (57) ABSTRACT

A method, system, and computer program product for facilitating power instability in a central electronics complex (CEC) of data storage computing environment in advance of a potential power failure is provided. Upon receipt of a first early power off warning (EPOW) signal indicating power instability, a first priority of execution of a first data storage task to be performed pursuant to a new data storage request is decreased, while a second priority of execution of a second data storage task to destage data in nonvolatile storage (NVS) to disk is increased. Upon receipt of a second EPOW signal indicating power failure, a system shutdown procedure is executed.

15 Claims, 4 Drawing Sheets

(56) References Cited

U.S. PATENT DOCUMENTS

| | | | |
|---|---|---|---|
| 2006/0212644 A1 | 9/2006 | Acton et al. | |
| 2007/0094446 A1 | 4/2007 | Sone et al. | |
| 2008/0005474 A1 | 1/2008 | Long | |
| 2008/0189484 A1 | 8/2008 | Iida et al. | |
| 2008/0244311 A1* | 10/2008 | Elliott et al. | 714/22 |
| 2009/0158070 A1* | 6/2009 | Gruendler | 713/340 |
| 2010/0042783 A1* | 2/2010 | Schwarz et al. | 711/118 |
| 2010/0052625 A1* | 3/2010 | Cagno et al. | 320/166 |
| 2010/0169031 A1* | 7/2010 | Dishman et al. | 702/60 |

OTHER PUBLICATIONS

"PowerPC™ Microprocessor Common Hardware Reference Platform: A System Architecture". IBM Corporation et al. Morgan Kaufmann Publishers, Inc. 1995. ISBN 1-558603948.*

"Hitachi Universal Storage Platform V, Hitachi Universal Storage Platform VM," User and Reference Guide, Hitachi Data Systems, 2008, http://www.hds.com/assets/pdf/hitachi-universal-storage-platform-v-hitachi-universal-storage-platform-vm-user-and-reference-guide.pdf.

"Symmetrix 8000 Enterprise Plus Storage Systems," Product Description Guide, EMC Corporation, 2002, http://www.cpuservice.pl/pliki/pdf/c756_sym8k_pdg.pdf.

"HP StorageWorks XP24000/XP20000 Disk Array," Overview, HP, version 14, Sep. 15, 2008, http://h18006.www1.hp.com/products/guickspecs/12711_na/12711_na.html.

* cited by examiner

POWER MANAGEMENT MECHANISM FOR DATA STORAGE ENVIRONMENT

BACKGROUND OF THE INVENTION

Field of the Invention

The present invention relates in general to computers, and more particularly to a method, system, and computer program product for facilitating power instability in a central electronics complex (CEC) of data storage computing environment in advance of a potential power failure.

Description of the Related Art

Data storage devices such as disks are commonplace in today's society. Devices such as controllers control access to the storage devices in response to read and write requests. The storage controllers also mirror data to different storage devices and spread data amongst different storage devices for redundancy and backup purposes. Storage controllers may store data in accordance with one of several redundant array of independent disk (RAID) security levels. Generally, the higher the RAID level the greater the redundancy of the data storage. Pooled storage devices may be used to increase storage capacity and provide recovery and backup services.

Data storage servers, such as an IBM Enterprise Storage Server (ESS), are also becoming commonplace. An IBM® ESS storage server includes two clusters of processors and associated hardware. Typically, there are four storage controllers in each cluster. Each of the storage controllers controls multiple storage devices grouped in RAID arrays. In one environment, clients with Fiber Channel Host Bus Adapters (HBA) are coupled via a Fiber Channel to a switch. The switch is also coupled to the Storage Server with Fiber Channel HBAs. There may be multiple storage servers per client. Each client is assigned or allocated storage "volumes" which are mapped to physical locations on storage devices that are grouped in RAID arrays. Consequently, clients make data access requests (reads and writes) to the storage server, for data within their allocated volumes, and the storage server accesses the mapped locations in cache storage to satisfy the requests or from disk if the data does not reside in cache storage.

A known IBM® Enterprise Storage Server comprises two clusters of storage controllers with four storage controllers per cluster. Each cluster has its own cache (semiconductor) memory shared by all storage controllers in the cluster. Each cluster also has battery backed up nonvolatile storage ("NVS") which is shared by all of the storage controllers in the cluster, although any one storage controller cannot use more than 25 percent of the total NVS allocated to the cluster. In addition, each storage controller has its own cache (disk) storage. The cache memory is used for rapid access to data inpaged from external storage to service read data access requests from memory and to provide buffering of modified data. All update requests are written to the associated cluster and backed up by the NVS on the mirrored cluster.

Storage systems such as ESS send commit messages to connected data hosts following the save of a copy of a serviced data trunk in NVS. After the commit message is received, hosts no longer need keep a copy of this data trunk. In some systems, in the event of a power loss, NVS does not function to retain data, but rather achieves the non-volatility by destaging the data onto a hard disk with the help of a battery backup component.

SUMMARY OF THE INVENTION

In implementations where NVS does not retain data but facilitates the destaging of the data to disk during a power loss, various mechanisms have been put into place to verify that a power outage, as opposed to power instability, occurs. The verification serves to, in the event of minor power instability, ensure that data processing tasks are uninterrupted. These mechanisms generally provide for, at the first detection of a power instability, the passage of a predetermined amount of time (e.g., 30 seconds) and the continued monitoring of the power supply before an early power off warning (EPOW) triggers a system shutdown procedure such as a fire hose dump (FHD) where data is destaged to disk while power is supplied from battery backup. The battery backups are implemented to supply power for a small time window (e.g., five minutes).

In cases of an actual power failure, however, pausing any destage activity to verify the outage cuts into the battery time available to perform the system shutdown procedure. In some embodiments, this drawback is compensated for by providing additional power subcomponents to provide additional power supply time. The subcomponents, however, add additional complexity and cost.

In light of the above, a need exists for a power failure warning/shutdown mechanism that facilitates power instability, yet in the case of a power failure, provides for ample power resources to complete data destaging activities without the need for additional power subcomponents.

Accordingly, in one embodiment, by way of example only, a method for facilitating power instability in a central electronics complex (CEC) of data storage computing environment in advance of a potential power failure is provided. Upon receipt of a first early power off warning (EPOW) signal from a power supply module indicating power instability, a first priority of execution of a first data storage task to be performed pursuant to a new data storage request is decreased, while a second priority of execution of a second data storage task to destage data in nonvolatile storage (NVS) to disk is increased. Upon receipt of a second EPOW signal from the power supply module indicating power failure, a system shutdown procedure is executed.

In an additional embodiment, again by way of example only, a system for facilitating power instability in a central electronics complex (CEC) of data storage computing environment in advance of a potential power failure is provided. A power management module is operable on the CEC. The power management module in communication with a central processing unit (CPU) and a memory unit in the CEC. The power management module is adapted for, upon receipt of a first early power off warning (EPOW) signal from a power supply module indicating power instability, decreasing a first priority of execution of a first data storage task to be performed pursuant to a new data storage request, while increasing a second priority of execution of a second data storage task to destage data in nonvolatile storage (NVS) to disk, and upon receipt of a second EPOW signal from the power supply module indicating power failure, executing a system shutdown procedure.

In still another embodiment, again by way of example only, a computer program product for facilitating power instability in a central electronics complex (CEC) of a data storage computing environment in advance of a potential power failure is provided. The computer program product comprises a computer-readable storage medium having computer-readable program code portions stored therein. The computer-readable program code portions comprise a first executable portion for, upon receipt of a first early power off warning (EPOW) signal from a power supply module indicating power instability, decreasing a first priority of execution of a first data storage task to be performed pursuant to a new data storage request, while increasing a second priority of execution of a second data storage task to destage data in nonvolatile storage (NVS) to disk, and a second executable portion for, upon receipt of a second EPOW signal from the power supply module indicating power failure, executing a system shutdown procedure.

Though the form of how the EPOW signal transferred from the power supply module to the CEC is different from each individual system, in most cases the EPOW signal takes the form of a formatted message sent via some communication channel (e.g., via an inter-integrated circuit (I2C) bus). In implementations where the EPOW signal comprises a formatted message, one field in the format structure may be selected. Differing values in this field may be set to correspond to the first and second EPOW signals. The first EPOW signal indicates the commencement of power instability, whereas the second EPOW signal indicates that a power failure has been confirmed. If the power instability lasts for a period shorter than the predefined monitor time, the second EPOW signal may be used to further indicate the end of power instability and the return of normal power supply by setting yet another value in the selected message format field.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below provide mechanisms for facilitating power instability in a central electronics complex (CEC) of a data storage computing environment in advance of a potential power failure. These mechanisms may implement several types of early power off warning (EPOW) signals. A first EPOW signal may be sent at the first detection of an unstable power supply, and designated as an "instable" EPOW. Another EPOW may be sent at the conclusion of a predetermined time and/or at the first detection of a power failure, and may designated as a "failure" EPOW. An additional EPOW may be sent at the detection of a power restoration, and may be designated a "restoration" EPOW.

In addition to the potential use of several EPOW signals, the mechanisms may implement a prioritization scheme in which, upon the detection of the first power instability, priority for new data processing tasks (such as pursuant to new data requests) are decreased, while at the same time priority for existing data processing tasks, particularly the destage of data to disk, is increased. During this reprioritization, battery life may be monitored to determine if enough capacity remains to completely execute a system shutdown procedure (such as FHD). If, during the course of the reprioritization, it is discovered that the capacity is lacking, the system shutdown procedure is immediately commenced, so that data preservation is ensured.

Figure 1:
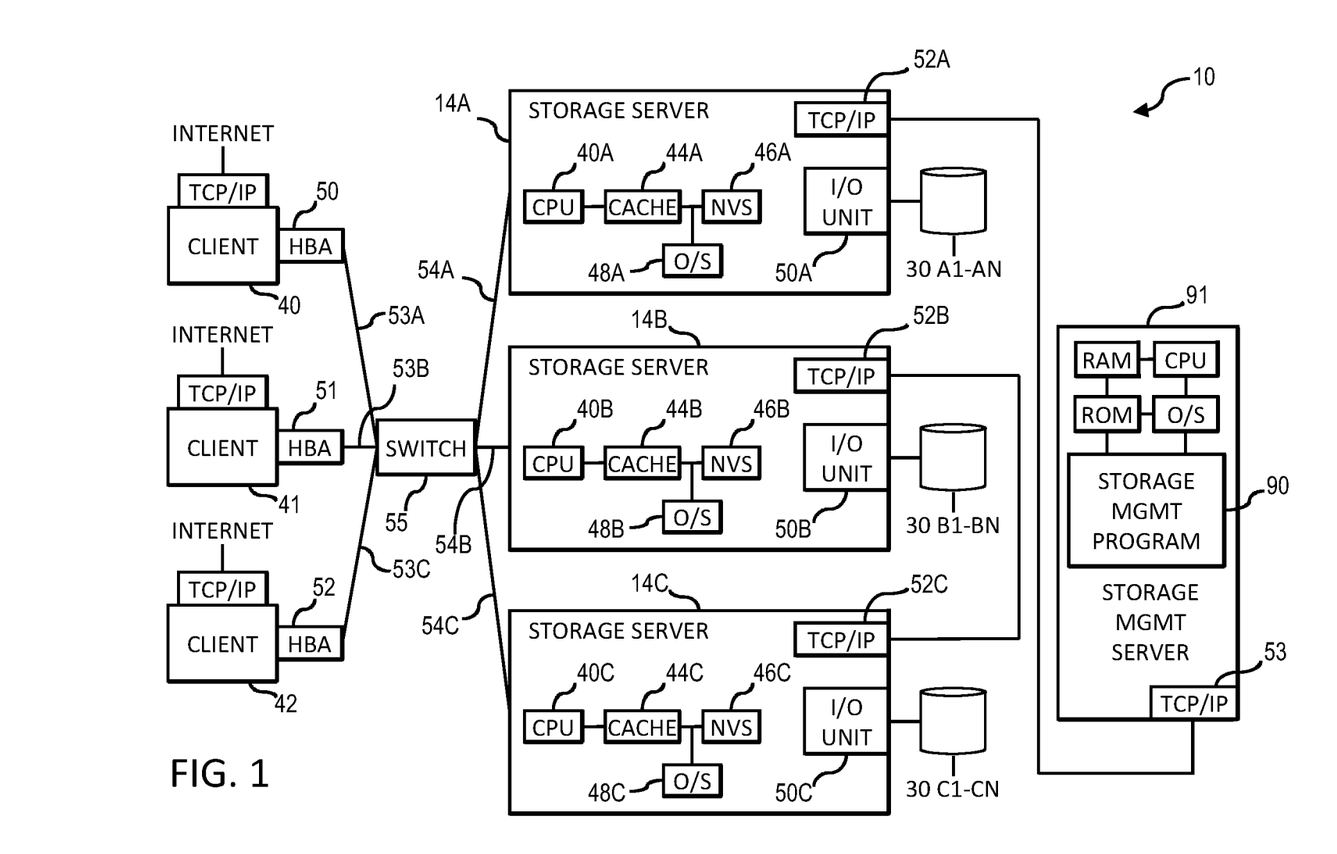
FIG. 1 is a block diagram of an exemplary distributed computer system including storage servers and a storage management server, in which aspects of the following description and claimed subject matter may be implemented.

FIG. 1 hereafter provides one example of a portion of a mirrored data storage system architecture in which the mechanisms of the illustrative embodiments may be implemented. It should be appreciated, however, that FIG. 1 is only exemplary and is not intended to state or imply any limitation as to the particular architectures in which the exemplary aspects of the illustrative embodiments may be implemented. As the skilled artisan will anticipate, many modifications to the architecture depicted in FIG. 1 may be made without departing from the scope and spirit of the following description and claimed subject matter.

FIG. 1 illustrates an exemplary distributed computer system generally designated 10 which includes the present invention. System 10 comprises multiple, similar storage servers 14*a,b,c* with respective central processing units (CPUs) 40*a,b,c*, cache 44*a,b,c*, nonvolatile storage ("NVS") 46*a,b,c*, operating system 48*a,b,c*, I/O unit 50*a,b,c*, and TCP/IP adapter card 52*a,b,c*. Each of the storage servers 14*a,b,c* manages storage allocation and access to multiple storage devices (such as disks) 30*a*1-*an*, 30*b*1-*bn*, and 30*c*1-*cn*, respectively, by clients 40, 41 and 42. Storage servers 14*a,b,c* also may be referred to herein as central electronics complexes (CECs), as each of the storage servers contains electronics subcomponents responsible for carrying out and managing data storage.

Clients 40, 41 and 42 have adapter cards 50, 51 and 52, such as a Fibre Channel adapter cards, for connection via a communication path 53*a,b,c*, such as a Fibre Channel, to a switch 55. Switch 55 can be coupled to storage servers 14*a,b,c* via host busses 54*a,b,c*, and can forward a request from any of the clients 40, 41 or 42 to any of the storage servers 14*a,b,c* as configured on the client. An administrator has allocated to each of the clients 40, 41 and 42 a number of storage "volumes". Each "volume" resides on a storage array. A "storage array" can comprise one or more storage devices and be configured in a variety of RAID levels such as RAID 5, RAID 10 or Just a Bunch of Disks (commonly referred to as JBOD).

Figure 2:
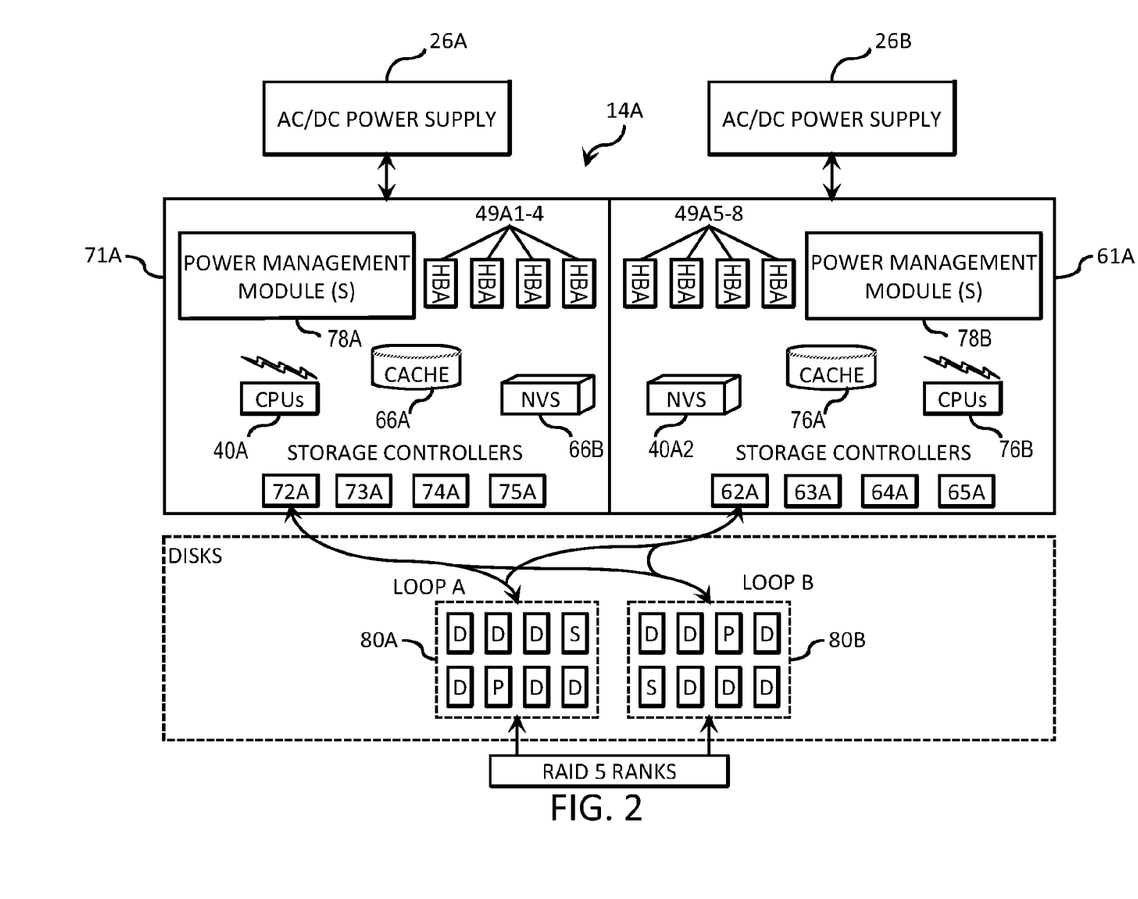
FIG. 2 is a block diagram of one of the storage servers of FIG. 1.

In the exemplary embodiment illustrated in FIG. 2, storage server/CEC 14*a* (and likewise storage servers 14*b* and *c*) includes two identical clusters 61*a* and 71*a* of CPUs, Cache, NVS, and storage controllers, with four storage respective controllers 62*a*-65*a* and 72*a*-75*a* per cluster. There is a shared cache (semiconductor) memory 66*a* and 76*a* for each cluster 61*a* and 71*a*, respectively. Each cluster also contains battery backed-up storage 66*b* and 76*b* (also called "NVS"). In FIG. 2, "D" represents a data disk, "P" represents a parity disk for storing parity bits for the data in the data disks, and "S" represents a spare disk in the event of failure of a data disk or parity disk. Each cluster maintains a mapping of the storage allocation to each client that correlates each storage volume to corresponding physical locations on the storage arrays.

When the client requests access to storage, i.e. to read from or write to data in one of the volumes allocated to the client, then the storage cluster that manages that volume will process the request, i.e. temporarily store client updates into the cache memory and NVS on the paired cluster. For update requests, an I/O completion notification is sent to the client upon NVS store. Upon reaching an internal threshold for pending writes, the cluster will map the client request to the physical locations, and then forward the mapped request from the cache storage to the appropriate storage array. For read requests, data is either satisfied from cache memory or requires disk access (because of a "cache miss"). Cache misses for read requests require the cluster to map the client request to the physical locations on the storage array and transfer the data from the physical location on the arrays to the cache memory where it satisfies the client I/O request.

Referring again to FIG. 1, system 10 also includes a storage management program (SMP) module 90 in a storage management server 91, according to the present invention to detect failover occurrences, implement the aforementioned preserved memory cache, and process the retained tracks. In the illustrated embodiment, computer 91 is coupled to storage servers 14a,b,c via a SAN network. Alternately, there can be a separate instance of module 90 executing on each storage server 14a,b,c and communicating with the other instances of program 90 on the other storage servers via a TCP/IP network. The skilled artisan will appreciate that a variety of implementations of SMP module in communication with the overall storage subsystem are contemplated.

Referring again to FIG. 2, two alternating current/direct current (AC/DC) power supply units 26a and 26b are shown connected to storage server/CEC 14a. In the depicted embodiment, a power supply 26a is connected to cluster 71a, while power supply 26b is connected to cluster 61a. Distribution of power to the CEC 14a is controlled by the power supplies 26a and 26b. Power supplies 26a and 26b are connected to each of power management module 78a (resident or operational on cluster 71a) and power management module 78b (resident or operational on cluster 61a). The functionality of power supplies 26a and 26b in conjunction with power management modules 78a and 78b will be further described, following.

Power management modules 78a and 78b may be adapted for monitoring the battery capacity of the battery backups in NVS 66b and 76b. For example, as previously described, when a power instability and/or power failure is determined, the power management modules 78a and 78b may determine the remaining battery life in view of necessary destaging activity occurring from the NVS 66b and 76b to disk.

Figure 3:
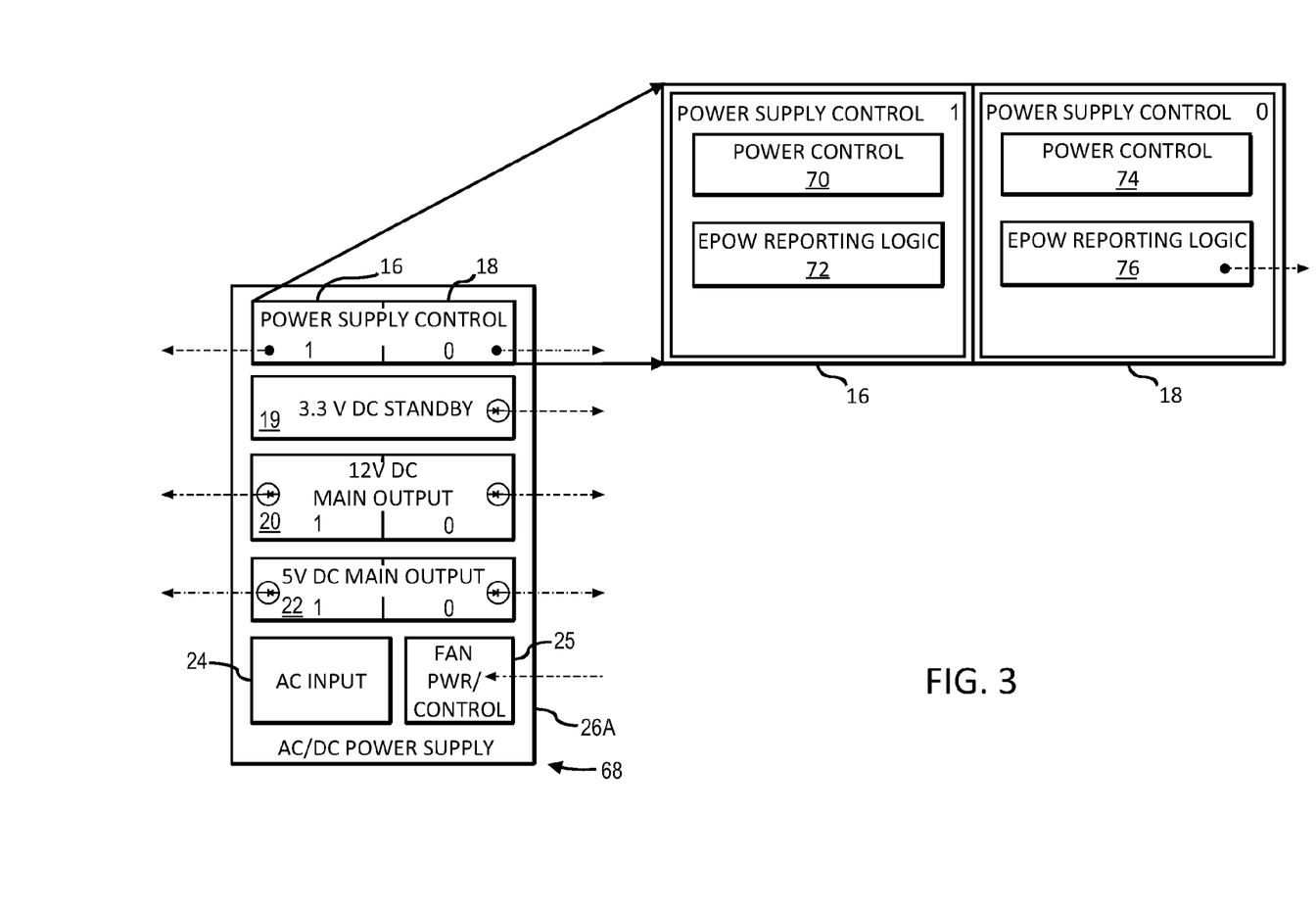
FIG. 3 is a block diagram of an exemplary AC/DC power supply and integrated power supply control module.

FIG. 3 further illustrates the exemplary AC/DC power supply 26a shown in FIG. 2 previously. Power supply 26a includes an embedded power supply control 16 and 18, 3.3V DC standby 19, 12V DC main output 22, AC input 24, and fan/power control 25. FIG. 3 also illustrates a conceptual view 68 of the AC/DC power supply 26a to depict the implementation of example early power off warning (EPOW) reporting logic integrated into the power supply control 16 and 18. Logic blocks 16 and 18 include power control modules 70 and 74 that can control various power operations. In addition, EPOW reporting logic 72 and 76 is shown integrated into logic blocks 16 and 18, respectively.

Power supply control 16 and 18 can include integrated hardware, software, firmware, or a combination of hardware, software, and firmware to perform various aspects of the present invention, including detection of a loss of input power or a detection of a loss of an output stage of the power supply 26a. EPOW reporting logic blocks 72 and 76 can implement and execute a variety of EPOW notification signals according to a predetermined schedule. The notifications can be sent to the power management modules 78a and 78b in the CEC/storage server 14a (FIG. 2). Once the notification signals are received, the power management modules 78a and 78b can take various steps as will be further described.

Figure 4:
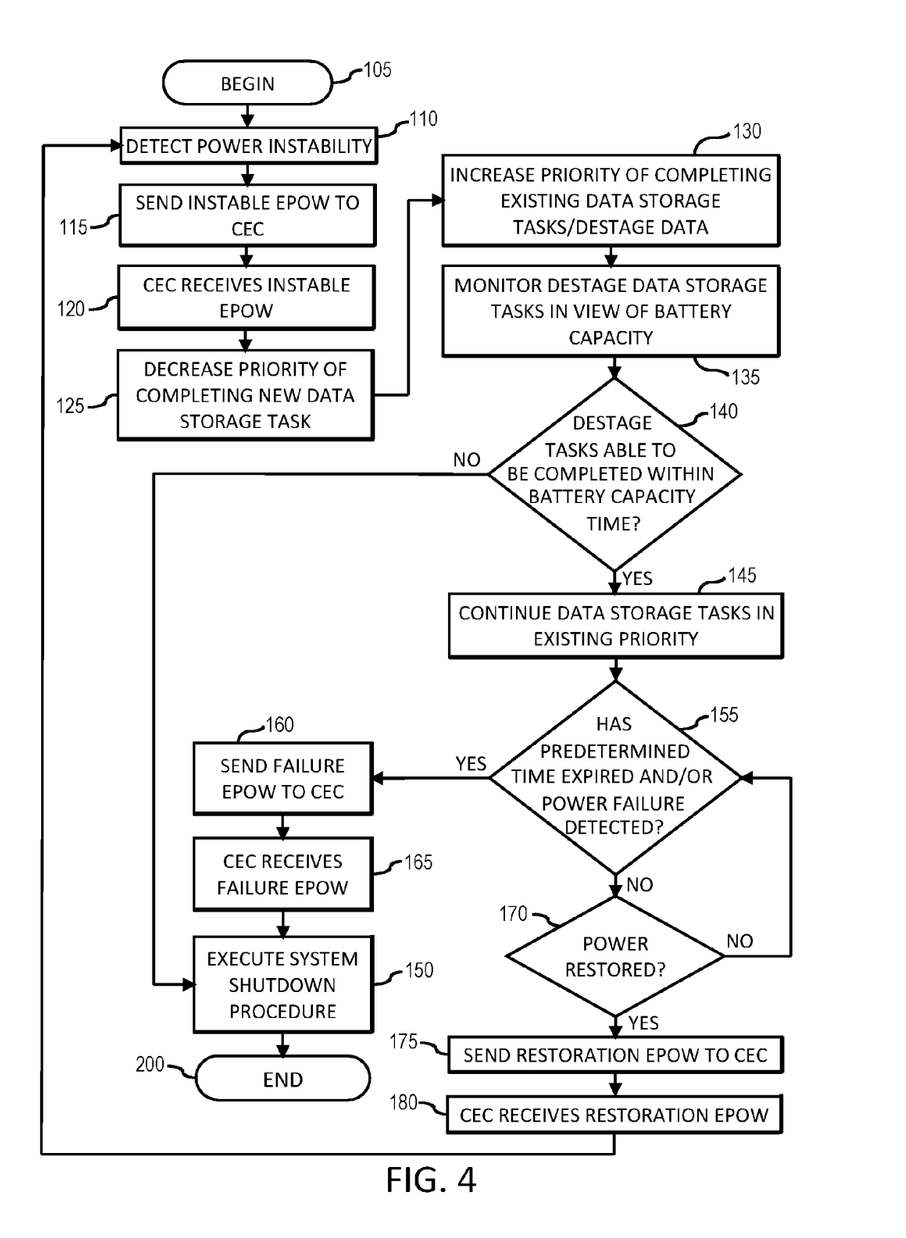
FIG. 4 is a flow chart of an exemplary method for facilitating power instability in a central electronics complex (CEC) of a data storage computing environment in advance of a potential power failure.

FIG. 4, following, illustrates an exemplary method 100 for facilitating power instability in a central electronics complex (CEC) of a data storage computing environment in advance of a potential power failure. As one skilled in the art will appreciate, various steps in the method 100 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Method 100 begins (step 105) with the detection of power instability (step 110) by the power control module. Following this detection, a first, instable EPOW (indicating power instability) is sent to the CEC (step 115), and is received by a power management module in or operational on the CEC (step 120). Data fields in each of the EPOW signals may be used to indicate the various types of EPOW signals. For example, for the instable EPOW, the data field may be manipulated to indicate that the EPOW received by the CEC is an instable EPOW, and so on.

Upon receipt of the instable EPOW in the CEC, the power management module, in conjunction with NVS, works to decrease the priority of completing new data storage tasks, such as those pursuant to new data storage requests (step 125). At the same time, the priority of completing existing data storage tasks, particularly those data tasks involving destage of data from NVS to disk is increased (step 130). Here, the purpose is to delay accepting new data requests as much as possible by pushing the delay to the limit of protocol (e.g., fibre channel small systems computer interface (FC-SCSI) or fiber connectivity (FICON)). However, the reprioritization scheme is constructed in such a way that the client/host does not view the implementation of the reprioritization as a stoppage of service.

Once this reprioritization is begun, the power management module monitors the destaging in view of battery capacity (step 135). If the remaining destage tasks will be completed within the battery capacity time (step 140), then the data storage tasks are sequentially completed as previously. If the system determines that the remaining battery capacity is lacking in view of uncompleted tasks (again, step 140), then the applicable system shutdown procedure, such as FHD, is immediately executed (step 150) without regard to whether additional EPOW signals have been sent/received, and the method 100 ends (step 200).

If the data storage tasks however continue (as enough battery capacity remains) (again, step 145), then control moves to step 155, where the power control module makes at least one additional determination as to whether a predetermined time (e.g., 30 seconds) has expired and/or a power failure has been detected (step 155). If so, then a second, failure EPOW (indicating a power failure) is sent to (step 160) and received (step 165) by the CEC. Upon receipt of the power failure EPOW, the system implements the system shutdown procedure (again, step 150), and the method ends (again, step 200).

If the passage of time has not yet expired and/or a power failure has not been detected (again, step 155), then the power control module determines whether power has been restored (step 170). If no, control returns again to step 155, where the system checks for the expired time and/or a power failure. If, however, a power restoration is detected, (again, step 170), then a third, power restoration EPOW (indicating the power restoration to the system) is sent to (step 175) and received by (step 180) the CEC, and the system returns to normal operation (returning to step 110) until additional power instability is detected (again, step 110).

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Various types of processors may also implement modules. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for facilitating power instability in a central electronics complex (CEC) of data storage computing environment in advance of a potential power failure, comprising:
    upon receipt of a first early power off warning (EPOW) signal indicating an input electrical power instability has been detected in the CEC, decreasing a first priority of execution of a first data storage task to be performed pursuant to a new data storage request thereby delaying acceptance of the new data storage request to a limit of protocol used for conveying the new data storage request, while increasing a second priority of execution of a second data storage task to destage data in nonvolatile storage (NVS) to disk;
    upon the passage of at least a predetermined threshold of time comprising no less than 30 seconds subsequent to the first EPOW thereby allowing a timeframe for the decreasing the first priority and increasing the second priority wherein a complete destaging of all the data in the NVS to the disk is attempted, and upon receipt of a second EPOW signal indicating power failure, executing a system shutdown procedure; and
    while decreasing the first priority and increasing the second priority upon receipt of the first EPOW such that the power failure has not yet occurred, monitoring execution of the second data storage task and additional data storage tasks to destage the data in NVS to the disk in view of a battery capacity time for performing the system shutdown procedure, wherein if the second and additional data storage tasks are not able to be completed within the battery capacity time as monitored during the decreasing of the first priority and increasing the second priority, the system shutdown procedure comprising a fire hose dump (FHD) procedure is immediately executed regardless of whether the second EPOW has been received.

2. The method of claim 1, further including sending the first EPOW signal to the CEC in response to a detection of a power instability.

3. The method of claim 2, further including sending the second EPOW signal to the CEC in response to one of: (a) a detection of a power failure, and (b) the detection of the power failure and the expiration of a predetermined time following the detection of the power instability.

4. The method of claim 3, further including sending a third EPOW signal to the CEC in response to one of: (a) a detection of a power restoration, and (b) the detection of the power restoration and the expiration of the predetermined time following the detection of the power instability, wherein the third EPOW indicates the power restoration to the CEC.

5. The method of claim 4, further including selecting data fields in a format structure of the first, second and third EPOW signals to provide indicators of the power instability, the power failure and power restoration to the CEC.

6. A system for facilitating power instability in a central electronics complex (CEC) of data storage computing environment in advance of a potential power failure, comprising:
    a power management module operable on the CEC, the power management module in communication with a central processing unit (CPU) and a memory unit in the CEC, wherein the power management module is adapted for:
    upon receipt of a first early power off warning (EPOW) signal indicating an input electrical power instability has been detected in the CEC, decreasing a first priority of execution of a first data storage task to be performed pursuant to a new data storage request thereby delaying acceptance of the new data storage request to a limit of protocol used for conveying the new data storage request, while increasing a second priority of execution of a second data storage task to destage data in nonvolatile storage (NVS) to disk,
    upon the passage of at least a predetermined threshold of time comprising no less than 30 seconds subsequent to the first EPOW thereby allowing a timeframe for the decreasing the first priority and increasing the second priority wherein a complete destaging of all the data in the NVS to the disk is attempted, and upon receipt of a second EPOW signal indicating power failure, executing a system shutdown procedure, and
    while decreasing the first priority and increasing the second priority upon receipt of the first EPOW such that the power failure has not yet occurred, monitoring execution of the second data storage task and additional data storage tasks to destage the data in NVS to the disk in view of a battery capacity time for performing the system shutdown procedure, wherein if the second and additional data storage tasks are not able to be completed within the battery capacity time as monitored during the decreasing of the first priority and increasing the second priority, the system shutdown procedure comprising a fire hose dump (FHD) procedure is immediately executed regardless of whether the second EPOW has been received.

7. The system of claim 6, further including a power supply control module operable on an alternating current/direct current (AC/DC) power supply, the power supply control module in communication with the CEC, wherein the power supply control module is adapted for sending the first EPOW signal to the CEC in response to a detection of a power instability.

8. The system of claim 7, wherein the power supply control module is further adapted for sending the second EPOW signal to the CEC in response to one of: (a) a detection of a power failure, and (b) the detection of the power failure and the expiration of a predetermined time following the detection of the power instability.

9. The system of claim 8, wherein the power supply control module is further adapted for sending a third EPOW signal to the CEC in response to one of: (a) a detection of a power restoration, and (b) the detection of the power restoration and the expiration of the predetermined time following the detection of the power instability, wherein the third EPOW indicates the power restoration to the CEC.

10. The system of claim 9, wherein data fields in a format structure of the first, second and third EPOW signals are selected to provide indicators of the power instability, the power failure and power restoration to the CEC.

11. A computer program product for facilitating power instability in a central electronics complex (CEC) of data storage computing environment in advance of a potential power failure, the computer program product comprising a non-transitory computer-readable storage medium having computer-readable program code portions stored therein, the computer-readable program code portions comprising:

a first executable portion for, upon receipt of a first early power off warning (EPOW) signal indicating an input electrical power instability has been detected in the CEC, decreasing a first priority of execution of a first data storage task to be performed pursuant to a new data storage request thereby delaying acceptance of the new data storage request to a limit of protocol used for conveying the new data storage request, while increasing a second priority of execution of a second data storage task to destage data in nonvolatile storage (NVS) to disk;

a second executable portion for, upon the passage of at least a predetermined threshold of time comprising no less than 30 seconds subsequent to the first EPOW thereby allowing a timeframe for the decreasing the first priority and increasing the second priority wherein a complete destaging of all the data in the NVS to the disk is attempted, and upon receipt of a second EPOW signal indicating power failure, executing a system shutdown procedure; and a third executable portion for, while decreasing the first priority and increasing the second priority upon receipt of the first EPOW such that the power failure has not yet occurred, monitoring execution of the second data storage task and additional data storage tasks to destage the data in NVS to the disk in view of a battery capacity time for performing the system shutdown procedure as monitored during the decreasing of the first priority and increasing the second priority, wherein if the second and additional data storage tasks are not able to be completed within the battery capacity time, the system shutdown procedure comprising a fire hose dump (FHD) procedure is immediately executed regardless of whether the second EPOW has been received.

12. The computer program product of claim 11, further including a fourth executable portion for sending the first EPOW signal to the CEC in response to a detection of power instability.

13. The computer program product of claim 12, further including a fifth executable portion for sending the second EPOW signal to the CEC in response to one of: (a) a detection of a power failure, and (b) the detection of the power failure and the expiration of a predetermined time following the detection of the power instability.

14. The computer program product of claim 13, further including a sixth executable portion for sending a third EPOW signal to the CEC in response to one of: (a) a detection of a power restoration, and (b) the detection of the power restoration and the expiration of the predetermined time following the detection of the power instability, wherein the third EPOW indicates the power restoration to the CEC.

15. The computer program product of claim 14, further including a seventh executable portion for selecting data fields in the first, second and third EPOW signals to provide indicators of the power instability, the power failure and power restoration to the CEC.

* * * * *